Oct. 11, 1932.         S. OLSON            1,881,897
                   COUNTING CONVEYER
              Filed July 7, 1930      3 Sheets-Sheet 1

Inventor
Samuel Olson
by Burton Burton
his Attorneys

Oct. 11, 1932.  S. OLSON  1,881,897
COUNTING CONVEYER
Filed July 7, 1930   3 Sheets-Sheet 2

Inventor.
Samuel Olson.
by Burton Burton
his Attorneys.

Oct. 11, 1932.    S. OLSON    1,881,897
COUNTING CONVEYER
Filed July 7, 1930    3 Sheets-Sheet 3
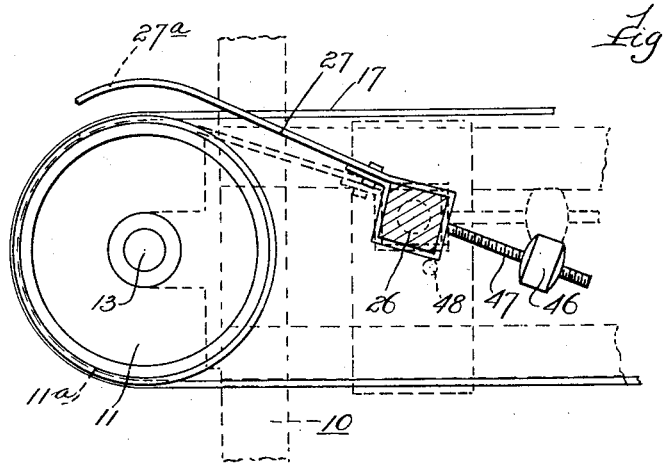
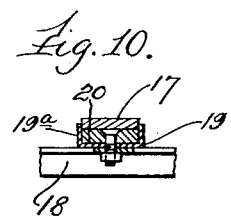
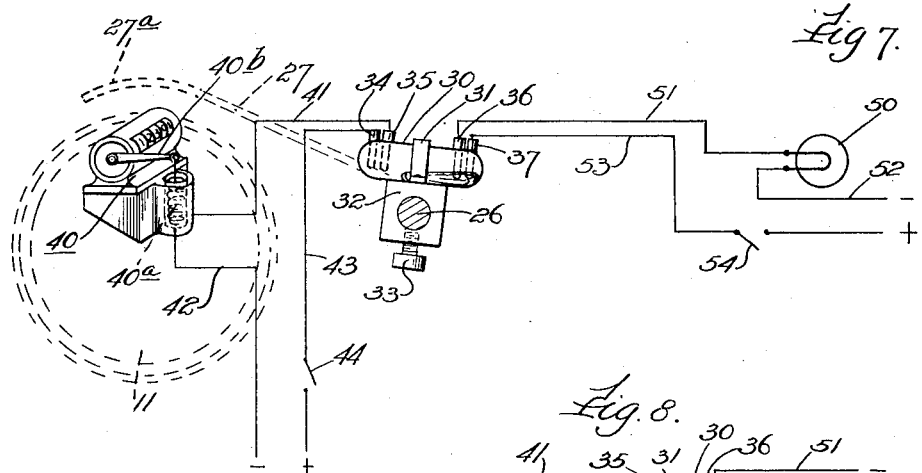
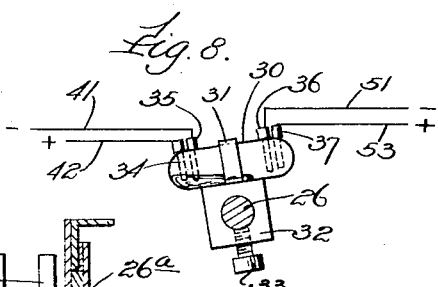
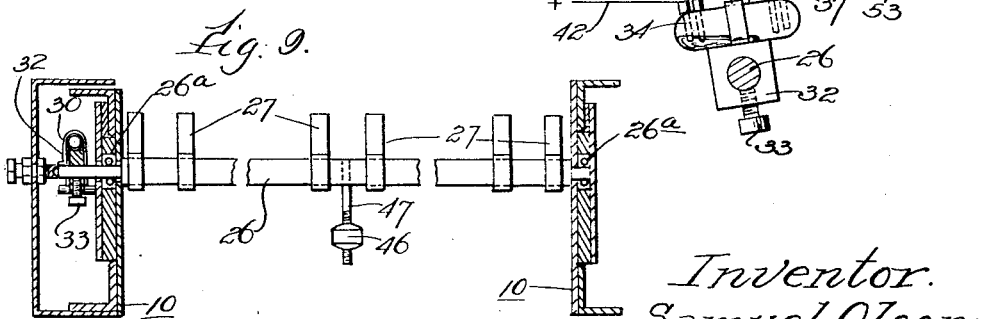
Inventor.
Samuel Olson Patented Oct. 11, 1932

1,881,897

UNITED STATES PATENT OFFICE

SAMUEL OLSON, OF OAK PARK, ILLINOIS

COUNTING CONVEYER

Application filed July 7, 1930. Serial No. 466,105.

This invention relates to a counting conveyer wherein the number of loads transported on the conveyer are recorded on a suitable instrument for such a purpose; and the main object of the present invention is to provide in connection with a continuously traveling conveyer a recording device adapted to be actuated by the loads or the articles as they are transported by the conveyer. Another object is to provide an improved mechanism for this purpose which is positive, accurate and comparatively sensitive for recording loads or parcels of relatively light weight and small in size, while at the same time being sufficiently rugged in construction for recording and handling loads of considerable size and weight with equal facility and accuracy. It consists in certain features and elements of construction herein shown and described and as indicated by the claims.

In the drawings:

Figure 6 is an enlarged sectional view showing the relation of the operating fingers to the head pulley.

Figure 7 is a detail view showing the "mercoid" tube mounted on the rock shaft carrying the operating fingers, and showing diagrammatically the electrical circuit and the recording device.

Figure 8 is a detail view showing the "mercoid" tube and rock shaft tilted to a position corresponding to the operative position of the fingers when engaged by a load on the conveyer.

Figure 9 is a transverse sectional view showing the rock shaft and its mountings.

Figure 10 is an enlarged detail view of guide supports for the upper run of tapes.

Figure 1:
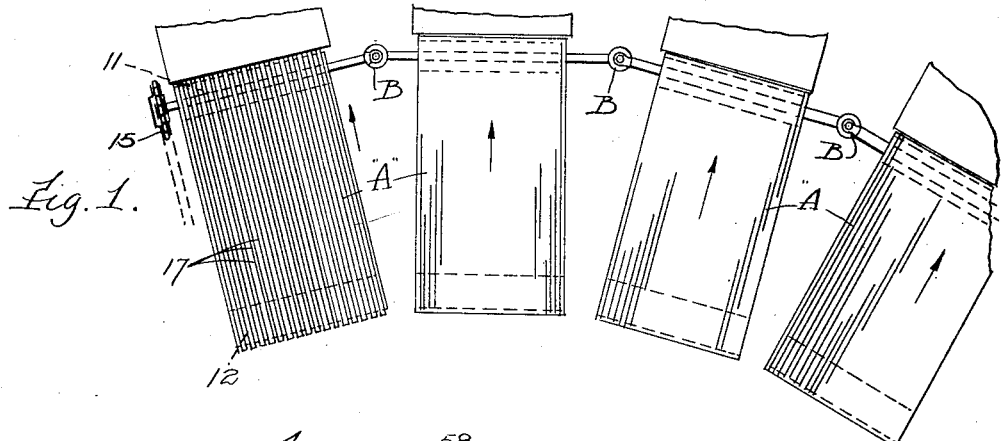
Figure 1 is a diagrammatic representation of a series of conveyers embodying the present invention showing a convenient arrangement for using conveyers of this character.

Conveyers of the type embodying the present invention may be used as separate units, but are ordinarily employed in a battery or series such as indicated at A, in the diagrammatic representation in Figure 1, in which four of these counting conveyers are arranged in an arc with the shafts of their several head pulleys interconnected by universal couplings, B, for driving the entire battery of conveyers as a unit from a convenient power source. To insure a more comprehensive understanding of this invention it may be here mentioned that conveyers of this character are adapted for various uses, and is especially suitable for use in connection with large mercantile establishments handling parcels of various sizes, shapes and weights, such as mail order houses, and in which the parcels to be handled are to be shipped via parcel post. Desirably, parcels of this nature that are consigned to substantially the same general locality, are grouped or classified to expedite shipment, and primarily because when large quantities of parcels are handled in this manner they are accorded a certain postage rate in bulk, depending upon the number of articles in the bulk quantity. The purpose of such handling naturally is to effect a substantial saving in postage, and labor, reducing handling by the clerks, and, in general, to expedite dispensing of the parcels to the proper railway terminals for transporting to their destinations. Accordingly, it is highly desirable to provide in connection with the conveyer, means which is relatively accurate and positive under substantially all conditions for recording packages or parcels of various shapes and sizes, within a fairly wide range of weights. It may be understood that all the parcels are first collected at a central area from which an attendant picks up the same one-by-one, and upon observing the destination of the respective parcel it is deposited on one of these conveyer units corresponding to the particular locality to which the parcel is consigned. Thus the parcels are sorted or grouped for a definite number of localities; and it may be further understood that the parcels are fed to or placed upon the respective conveyer units one at a time, at a substantial distance apart in the direction of travel of the conveyer so as to insure that each parcel will be recorded by the recording device.

Figure 2:
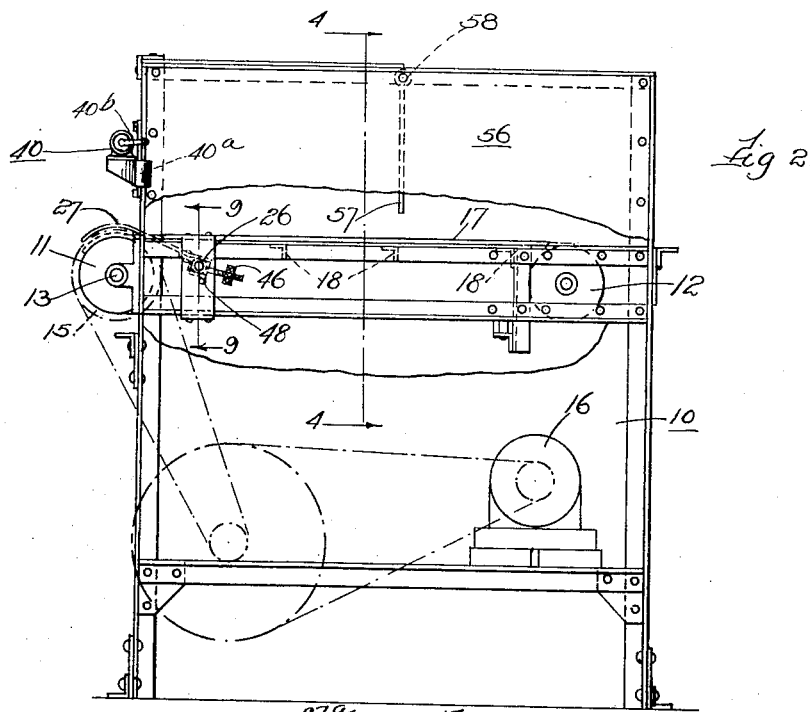
Figure 2 is a side elevation of a conveyer embodying the present invention with portions of the framing and skirt structure broken away to show details of construction.
Figure 5:
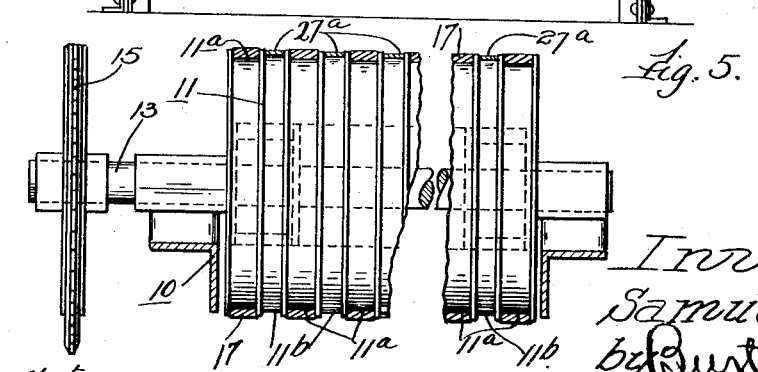
Figure 5 is an enlarged fragmentary view of the head pulley, showing the tapes and fingers in section.
Figure 3:
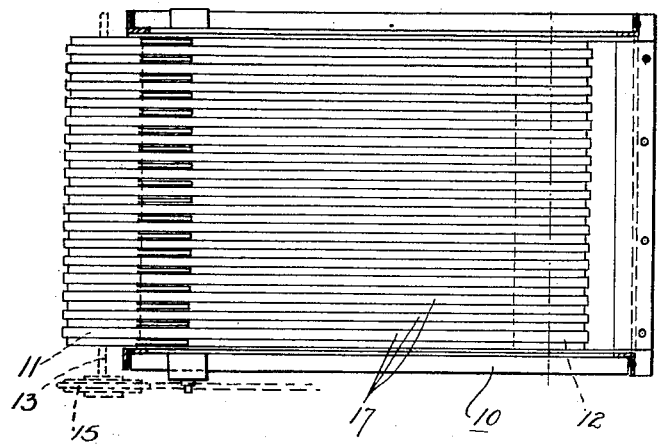
Figure 3 is a plan view of the conveyer.
Figure 4:
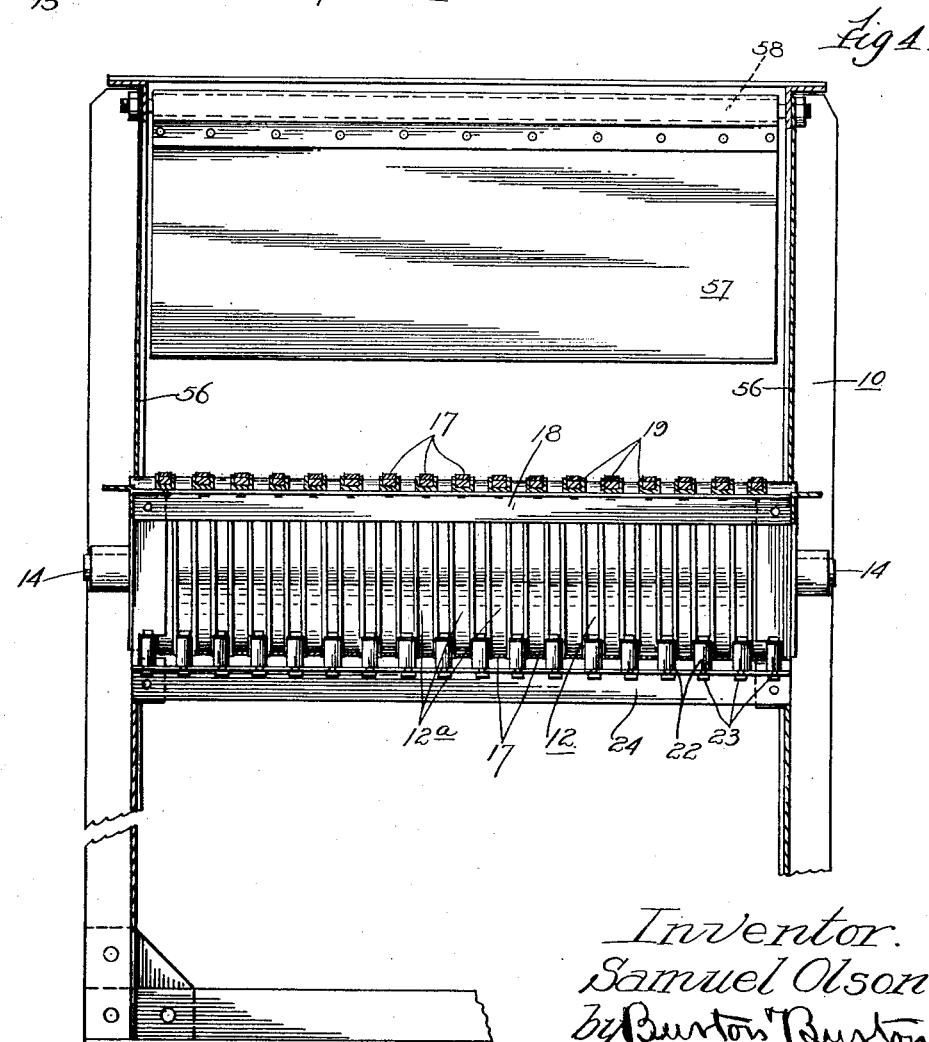
Figure 4 is an enlarged transverse sectional view taken substantially as indicated at the line 4—4 on Figure 2.

Each of these conveyer units are preferably supported by a suitable framing structure, indicated generally at 10, each including head and pulleys, 11 and 12, mounted on head and foot shafts, 13 and 14, respectively, journaled in bearings carried on said framing, 10. The head shaft, 13, is provided with a suitable driving wheel, 15, which is driven by chains or belts from the motor indicated at 16, as seen in Figure 2. Trained around the respective head and foot pulleys are a plurality of transversely spaced, relatively narrow tapes, 17, and for convenience, and to insure guidance of these tapes, as well as positioning against transverse shifting on their respective pulleys, these pulleys are provided with circumferential grooves, 11$^a$ and 12$^a$, respectively, whose depth permits seating of the tapes therein, so that their outer surface is disposed slightly above the outer surface of said pulleys so as to insure frictional contact with the parcels or objects handled thereby. The up-run of these tapes are supported for substantially the entire distance between the head and foot pulleys so as to insure sufficient ruggedness of construction for transporting loads or parcels of considerable weight. The support for the up-run of tapes consists of a plurality of longitudinally spaced transversely extending cross members, 18, rigidly connected to the framing structure, 10, at their ends, and rigidly secured on said cross members are a plurality of longitudinally extending channel guideways, 19, of U-shaped cross section, as seen in Figures 4 and 10, of the drawings, whose sides, 19$^a$, are spaced apart a distance corresponding to substantially the width of the tapes. Rigidly secured in the bottom of said U-shaped guideways are filler or lining members, 20, providing a suitable surface on which the tapes, 17, are adapted to slide over. The members, 20, are of a thickness so as to lie a substantial distance below the upper ends of the upright flanges, 19$^a$, so that said flanges will provide lateral guidance for the tapes, to insure that they move in a true longitudinal path. The lining element, 20, preferably should be of a material having a relatively low coefficient of friction, and for this purpose I have found wood to be suitable.

The lower run of the tapes are guided in a true longitudinal path by passing between upwardly disposed guide rollers, 22, which are journaled and supported on bolts, 23, carried on a cross member, 24, connected to the framing, 10, as seen in Figure 4.

Mounted adjacent the head pulley, 11, is a transversely extending rock shaft, 26, whose outer ends are journaled in the roller bearings, 26$^a$, so as to insure minimum friction and render the shaft relatively sensitive to turning. Rigidly mounted on said shaft are a plurality of transversely spaced operating fingers, 27, extending upwardly between the uprun of the tapes and their cooperating guideways, 19, with terminal portions, 27$^a$, extending a substantial distance above said tapes and overlying the head pulley, as may be seen in Figure 6, in position for engagement by the parcel or object transported by said tapes. The terminal portions of the fingers are preferably shaped to conform to the contour of the head pulley, and to insure that these fingers do not impede the movement of the loads by their frictional engagement with the tapes, said head pulley is provided with circumferential grooves, 11$^b$, intermediate the grooves, 11$^a$, for said tapes, in which grooves, 11$^b$, the terminal portions, 27$^a$, of said operating fingers are adapted to be disposed, below the surface of the tapes when they are engaged by a load. These grooves, 11$^b$, are of sufficient depth to afford ample clearance for the portions, 27$^a$, of the fingers, thus insuring against imposing any undue strain or load on the operating mechanism by reason of the frictional contact of the fingers with the pulley. Thus each time a load engages these operating fingers and depresses the same below the surface of the tapes, the rock shaft, 26, is turned in its bearings to an angle corresponding to the movement of the fingers.

Mounted on said rock shaft, preferably adjacent one end, as seen in Figures 7 to 9, is a "mercoid" switch tube, 30, clamped rigidly thereto by brackets, 31, carried by a clamping block, 32, which is fixedly secured to the rock shaft at a desired position of adjustment by a set screw, 33. As shown in Figure 7 of the drawings, this "mercoid" tube is of the double pole type having a pair of terminals, 34, 35, and 36, 37, adjacent the respective ends thereof, so that in one position of adjustment of the rock shaft, that is, with the fingers, 27, disposed in their operative load-engaging position, the "mercoid" tube is so positioned that the body of mercury therein recedes to one end, clear of the terminals, 34 and 35, while making positive electrical contact between the terminals, 36 and 37, at the opposite end thereof; and likewise, when the fingers, 27, are depressed by reason of their engagement by a load, or parcel, the tilting of the rock shaft incident to the movement of the fingers shifts the body of mercury so as to break contact between the terminals, 36 and 37, and complete the contact between the terminals, 34 and 35, at the opposite end.

Conveniently arranged, either adjacent the conveyer or at a central station as preferred, is an electrical counting device, 40, of usual construction, which is connected in an electrical circuit employing the pair of terminals, 34, 35, of the "mercoid" switch, and, as illustrated diagrammatically in Figure 7 of the drawings, the circuit comprises a conductor, 41, connected to a solenoid, 40ª, which in turn is connected to an operating arm, 40ᵇ, for actuating the counting dials, and a conductor, 42, connecting the other terminal of the solenoid to a main power line while the other terminal, 34, of the "mercoid" switch is connected by a conductor, 43, to the other branch of the power line, with a control switch, 44, interposed therein.

It will now be apparent that (when the main switch, 44, is closed) each time a load engages the fingers, 27, and depresses the same, the rock shaft, 26, will be rotated through a short angle so as to complete the electrical circuit of the counting device through the terminals, 34 and 35, thereby actuating the counting device once every time that a load passes over said fingers. To insure sensitivity for actuating the counting device by comparatively light parcels, these fingers, 27, are made of very light material so as to permit free rocking of the shaft, 27, in its roller bearings, 26ª. However, to guard against "back-lash" or rocking of the rock shaft back and forth a number of times after the fingers are released by discharging a package over the head pulley, it is preferable to provide a check or stop for preventing the fingers from rocking too far as to cause undesired closing of the circuit through the terminals, 34 and 35, of the "mercoid" switch. For this purpose I provide a counter-weight, 46, adjustably mounted on an arm, 47, rigid with the rock shaft, 27, so as to obtain accurate adjustment for balancing the load-engaging portions, 27ª, of the fingers a desired distance above the tapes in the path of travel of the loads or parcels carried by said tapes. Thus the counter-weight positively returns the fingers to operative position just as soon as they are released by the load passing over the head pulley. To check the pendulous action of the fingers that may result by the use of the counter-weight, I provide a stop bar, 48, extending crosswise of the conveyer and supported on the framing, 10, and engageable with the counter-weight arm, 47, for limiting the upward travel of the fingers by rocking about the axis of the rock shaft. To further insure against this pendulous action in the fingers, a suitable form of dash pot may be provided which will act as a snubber for effecting smooth and easy checking of the return movement of the fingers and gradually arrest the same as they approach their operative position.

In order that an overseer may readily ascertain at a glance whether or not any one or all of the counting conveyers are functioning, irrespective of whether the counting devices, 40, are located at a central station or adjacent each conveyer, I provide an electric telltale lamp, 50, one of whose terminals is connected by a conductor, 51, to the terminal, 36, in the "mercoid" tube, while another conductor, 52, connects the other terminal of said lamp to one of the main power lines, and a third conductor, 53, connects the terminal, 37, of the "mercoid" switch tube to the other main power line with a switch, 54, interposed therein for controlling the same. When the switch, 54, is closed, the lamp, 50, will be illuminated at all times that the counting device is not functioning, or, in other words, at all times that the operating fingers are inactive and each time that the fingers are depressed by engagement with the load, thereby resulting in rocking of the shaft, 27, contact between the terminals, 36 and 37, will be broken, and the light, 50, will then go out, at which time the counter-circuit is completed through the body of mercury bridging the terminals, 34 and 35. By this arrangement an overseer may, by observing the lamps corresponding to the respective conveyer units, readily ascertain at a glance whether a certain one of the counting conveyers is properly functioning.

Since, in conveyer units of this nature, the parcels that are fed thereto or thrown thereupon do not necessarily travel in a parallel direction to the travel of the conveyer, but are sometimes thrown from one side, it is desirable to provide on opposite sides of the conveyer, extending substantially the entire length thereof, skirt panels, 56, so as to assist in confining the parcel or load on the tapes.

To insure against accidental operation of the fingers, and thereby actuating the counting device by reason of a package being directly thrown upon the fingers, or omission of the device to operate by reason of a parcel so handled, striking against a package that has already depressed the fingers, I provide a baffle element located a substantial distance forwardly of the operating fingers, and which, as herein shown, consists of a flexible panel, 57, preferably of material in the nature of canvas, extending transversely of the conveyer and terminating adjacent the top of the tapes, while its upper end is supported on a cross rod, 58, secured to the side skirts, 56. Thus, when the package is thrown onto the conveyer, and is so inaccurately directed as to travel a substantial distance above the tapes, it will strike against the canvas baffle, and will be arrested in its travel and be directed downwardly on top of the tapes.

I claim:

1. The combination with a horizontally traveling conveyer and load units carried thereon in spaced apart relation to the direction of travel, said conveyer including a series of transversely spaced tapes and head and foot wheels therefor, of a counting device, of a transverse rock shaft mounted below the up-run of tapes adjacent the head wheel, a plurality of fingers rigidly connected to the rock shaft and having portions normally adapted to extend upwardly between adjacent tapes, overlying and shaped to conform to the contour of said head wheel, in the path of travel of the loads, said fingers being adapted to be depressed below the tapes each time they are engaged by a load thereby rocking said shaft, said head wheel being formed with circumferential grooves to accommodate said fingers when they are depressed by a load, and means responsive to such rocking of the shaft for actuating the counting device.

2. The combination with a horizontal conveyer for carrying load units thereon in spaced apart relation to the direction of travel, said conveyer including a series of transversely spaced continuously moving tapes, of an electrically operated counting device associated with the conveyer, a rock shaft disposed below the up-run of the tapes, a plurality of fingers rigidly connected to said shaft and having portions extending upwardly between adjacent tapes of the up-run in the path of travel of the loads the rock shaft being furnished with a weighted lever arm for approximately counterbalancing the fingers, and a weight adjustable on said arm for effecting such approximation, said fingers being adapted to rock said shaft each time they are encountered by a load, and means responsive to such rocking of the shaft for completing the electrical circuit, thereby actuating the counting device.

3. In the construction defined in claim 2, the counterweight being adapted for adjustment on the lever arm for sufficiently overbalancing the fingers to rock the shaft in reverse direction for restoring the fingers to operative position immediately upon their disengagement by a preceding load.

4. The combination with a horizontal conveyer for carrying load units thereon spaced apart in the direction of travel, said conveyer comprising driving and driven rolls and a series of transversely spaced endless tapes extending between the rolls; a rock shaft extending transversely of the direction of travel of the tapes and having a plurality of rigid fingers projecting in the path of travel of the load units carried by the tapes, and means associated with said rock shaft for approximately counterbalancing the entire plurality of fingers; a counting device associated with the conveyer, and connections by which the rock shaft at each rocking movement due to an article carried by the tapes encountering the fingers causes the operation of the counting device, said rock shaft having the fingers at the part at which they are arranged for encounter of the load units extending over the roll at the delivery end of the conveyer, whereby the operation is not liable to be defeated by sagging of the tapes.

5. In combination with a horizontal conveyer for carrying load units spaced apart in the direction of travel of the conveyer, and a counting device having an operating member related to the conveyer for encounter by the load units individually in the order of their spaced-apart lodgement on the conveyer, a baffle member mounted in position overhanging the conveyer and for non-participation in the load-carrying movement of the conveyer extending longitudinally thereof adapted to arrest an article impelled transversely of the conveyer for deposit thereon and to cause the article to be deposited substantially at the position in the length of the conveyer at which it is thus arrested.

6. The construction defined in claim 5, the baffle member being a flexible sheet adapted to yield flexibly to the impact of the article impelled against it.

In testimony whereof, I have hereunto set my hand at Chicago, Illinois, this 3rd day of July, 1930.

SAMUEL OLSON.